Figure 1:
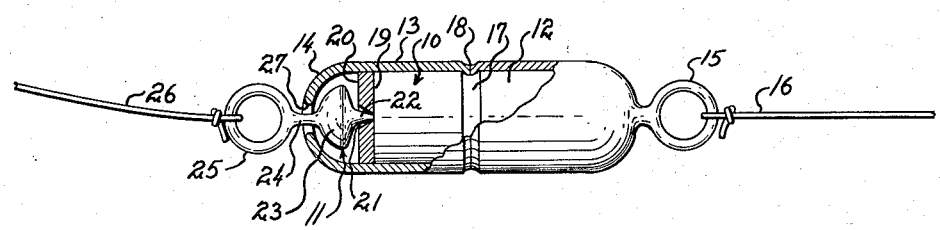

Dec. 4, 1956   F. C. A. LIND   2,772,902
SWIVEL CONNECTOR
Filed Aug. 20, 1952

INVENTOR
FRANKLIN C. A. LIND

BY Williamson, Williamson,
Schroeder & Adams ATTORNEYS

United States Patent Office 2,772,902
Patented Dec. 4, 1956

2,772,902

SWIVEL CONNECTOR

Franklin C. A. Lind, Randolph, Minn.

Application August 20, 1952, Serial No. 305,447

5 Claims. (Cl. 287—91)

This invention relates to a swivel connector and more particularly to a dual magnetic and mechanical swivel device.

It is often desired to use a swivel connection between two opposed elements, such as between a fish line and the connection with a lure, where the rotation of one of the elements will exert as small a torque or rotative influence as possible upon the other. Ball and roller bearing swivels, socket linkages, chain connections and many other similar low friction devices have been proposed. Often, however, even the most elaborate and expensive of these proposed swivels will not have sufficiently low friction for the purpose required. Then, too, the more the friction is reduced in these prior art devices, the more delicate becomes the structure and as a consequence the opposed elements under tension may break or damage the working parts of the swivel. Furthermore, complicated and delicate mechanism, such as has been previously proposed for low friction swivels, may become clogged or rendered sluggish by dirt and grit thus losing the very advantage claimed for the low friction connection.

It is an important object of my invention to provide a cheap and simple swivel connector which will be rugged and have normally low friction against transmitted torque under strong tension while at the same time possessing an extremely low frictional resistance against transmitted torque under a lesser tension.

It is a further object of the invention to provide a swivel connector in which one part will magnetically connect through low rotative resistance with another part and may further mechanically connect with the other part to prevent separation of the parts under stress.

It is a still further object of the invention to provide a low friction swivel which can rapidly and thoroughly untwist lines having opposed ends attached to the swivel while under no tension or moderate tension and which can also operate conventionally to untwist the lines even though under strong tension.

Figure 2:
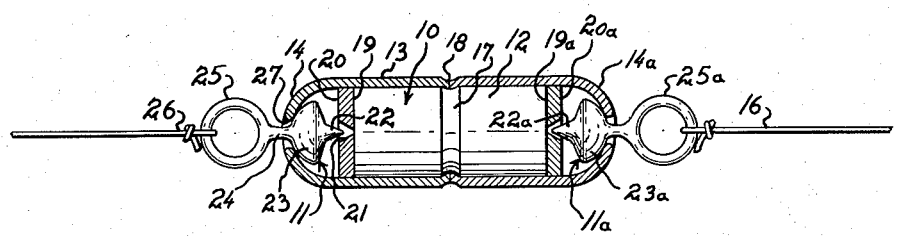

These and other objects and advantages of my invention will more fully appear from the following description made in connection with the accompanying drawings wherein like reference characters refer to similar parts throughout the several views and in which:

Fig. 1 is a side view of my swivel connector with the ends of two lines secured thereto in opposed relation under mild tension and a portion of the body cut away in vertical section to better show the relationship of the internal parts; and Fig. 2 is a horizontal section of an alternate form of the swivel device showing the relationship of the internal parts with the opposed lines under strong tension.

Referring now to the drawing, my swivel connector comprises a magnetic element indicated generally at 10 and a magnetic cooperating element indicated generally at 11. The magnetic element 10 may comprise a body member 12 preferably of cylindrical section which is secured within a casing 13 which has at one end thereof a projecting bearing portion 14. The casing 13 and its projecting portion 14 is preferably constructed of non-magnetic material. Means for attachment such as the eye hook 15 is secured to one end of the body 12 and an article such as a fish line 16 may be tied thereto. A groove 17 formed in the surface of body 12 may be supplied for preventing lengthwise movement of the body within the casing 13. A corresponding depression 18 may thus be formed in the casing to prevent such movement. Disposed at the end of the body 12 opposite the eye hook 15 is a bearing surface 19. A non-magnetic plate 20 may be positioned over the bearing surface 19 and has a conical opening 21 therethrough so as to expose but a small central area of the bearing surface 19. The portion 14 forms a housing for the cooperating magnetic element 11 which may be formed in the shape of a spindle having a point 22 and a knob-like body portion 23 to which is attached axially a shank 24 terminating in an eye hook 25 to which may be attached in turn another article such as a fish leader 26 or directly to a fish lure (not shown).

Referring to Fig. 2, an alternate form of my invention is shown in which the cooperating magnetic elements 11 and 11a are two in number and are attracted towards the magnetic element 10 at each end thereof, the polarity being opposite but the attracting power being equivalent in either event. In the latter alternative form another bearing surface 19a is formed at the end of the body 12 opposite the bearing surface 19 and a non-magnetic plate 20a may be similarly positioned over the bearing surface 19a. In my alternative form the articles 16 and 26 are both attached to the magnetic cooperating elements or spindles 11 and 11a instead of one being attached to a spindle and the other attached to the magnetic body as in the first form shown.

In the operation of my swivel connector the articles 16 and 26 are oppositely attached to their respective eye hooks 15 and 25 and a relative rotating motion given thereto as is in the case of a fish lure which rotates while being drawn through the water or while casting from a spinning reel in which the line strips axially from the spool. If the articles 16 and 26 are placed under no tension or moderate tension the spindle point 22 will remain in bearing contact with the bearing surface 19 of the magnetic body 12. One or the other of magnetic elements 10 or 11 may be a permanent type magnet or they may be both permanent magnets. The cooperating element 11 rotates almost without friction with respect to the magnetic element 10 until such time as a greater tension is placed upon the lines 16 and 26. Thus, if the magnetic attraction between the spindle 11 and the body 12 is overcome, the curved rear surface of the spindle body 23 will come in contact with the projecting bearing portion 14 with the shank 24 moving slightly outwardly through the reduced opening 27 which is axially disposed through the bearing portion 14. It may readily be seen that the curved surface of spindle body 23 will continue to have a rotative movement with respect to the magnetic element 10 even though no longer in contact with it. Furthermore, the tension between lines 16 and 26 may be increased within limits of the structural strength of my swivel. All the while, of course, there is a relative rotative engagement between the lines 16 and 26, the advantages of the low friction bearing being partly lost in the latter case however.

The operation of the alternate form shown in Fig. 2 is similar to that above described. Now, however, instead of magnetic element 10 being secured to the line 16 the spindle 11a is so secured. It may be seen that both lines 16 and 26 may rotate in the same or opposite directions without necessarily causing the rotation of the magnetic element 10. The projecting bearing portion 14a functions in the same manner with respect to the spindle 11a as does its counter part, bearing portion 14 with its corresponding spindle 11.

It may thus be seen that I have devised a novel swivel connector which has high utility in allowing relative rotation between two connected articles with an absolute minimum of friction therebetween while at the same time providing for a swiveling action of a less delicate nature under higher tension which will still be comparable to the conventional swivels presently known to me.

It will, of course, be understood that various changes may be made in the form, details, arrangement and proportions of the parts without departing from the scope of my invention.

What I claim is:

1. A swivel connector for joining in relatively rotatable relation two articles such as a fishline and a fish lure which comprises a body having a fastener at one end and a bearing surface at the other end, a spindle having an elongated and reduced shank with a fastener at one end and a bearing point at the opposite end thereof, at least one of said spindle bearing point and said body being magnetized and the other being constructed of magnetically attractable material, the spindle bearing point and the body bearing surface normally being in low friction rotative bearing contact, casing means attached to said body and surrounding said spindle in close clearance therewith and in opposed relation with respect to the spindle bearing point at the elongated and reduced shank, whereby, upon divergently pulling the respective fasteners of the body and of the spindle, the spindle bearing point and the bearing surface will be separated and the casing and the spindle will be brought into rotative bearing engagement.

2. A swivel connector for joining in relatively rotatable relation two articles such as a fishline and a fish lure comprising a magnetically attractable body having a fastener at one end for securing to one of said articles and a bearing surface at the other end thereof, a magnetically attractable cooperating element having a bearing surface at one end, a bearing point at the other end thereof and a fastener connected adjacent the cooperating element bearing surface for securing to the other of said articles, at least one of said bearing point and said body bearing surface being permanently magnetized and normally in magnetic bearing contact with the other, said respective fasteners being outwardly opposed, and means closely encompassing the cooperating element and secured to the body, said means being engageable with the bearing surface of said cooperating element for maintaining relative rotative bearing contact when the cooperating element point and the body bearing surface are urged apart by opposed pull on said fasteners.

3. A swivel connector for joining in relatively rotatable relation two articles such as a fishline and a fish lure comprising a magnetically attractable body having a fastener at one end and a bearing surface at the other end thereof, a magnetically attractable spindle having a bearing surface at one end, a bearing point at the other end thereof and a fastener connected adjacent the spindle bearing surface, at least one of said spindle point and said body bearing surface being permanently magnetized and normally in magnetic bearing contact, said respective fasteners being in outwardly opposed relation, and means closely encompassing the spindle and projecting from said body, said means being engageable with said spindle bearing surface for maintaining relative rotative bearing contact when the spindle point and the body bearing surface are separated against magnetic attraction by divergent pull on said fasteners.

4. A swivel connector for joining in relatively rotatable relation two articles such as a fishline and a fish lure comprising a magnetic first element having attachment means for securing to one of said articles, a magnetically attractable relatively rotatable second element normally in axial engagement at its forward end with the forward end of said magnetic first element and having attachment means in divergently opposed relation to the first mentioned attachment means for securing to the other of said articles, and a projecting member secured to one of said first and second elements extending around and to the rear of at least a portion of the other of said elements and normally in close clearance therewith, whereby said elements will be maintained in magnetic bearing relation under normal tensions applied between said articles and the respective attachment means, and will be separated against magnetic attraction and move into bearing engagement between said projecting member and said other of the first and second elements on application of divergent forces between the respective attachment means greater than the magnetic attraction between said first and second element.

5. A swivel connector for joining in relatively rotatable relation two article such as fishline and a fish lure comprising a medial magnetic body element, a pair of cooperative elements constructed of magnetically attractable material, each having an inwardly opposed end in axial rotatable bearing engagement at respective opposed ends of said magnetic body element, said cooperative elements each having outwardly opposed means for attachment respectively to said articles, a casing secured to said magnetic body element and having a projecting portion extending beyond each end of said magnetic body element and encompassing each of the cooperating elements in close clearance therewith while said cooperating elements and the body element are in rotative engagement, said magnetically attractable cooperating elements, when under diverging tension between said articles greater than the magnetic attraction between the cooperating elements and the body element, causing said cooperating elements to be moved outwardly of the respective ends of said magnetic body element and into rotative bearing engagement with said projecting portions respectively of each end of the casing.

References Cited in the file of this patent
UNITED STATES PATENTS

| 1,343,541 | Arbon | June 5, 1920 |
| 2,576,563 | Blewett | Nov. 27, 1951 |

FOREIGN PATENTS

| 11,738 | Great Britain | June 15, 1889 |